(12) United States Patent
Liu

(10) Patent No.: US 11,625,354 B2
(45) Date of Patent: Apr. 11, 2023

(54) CIRCUIT STRUCTURE WITH AUTOMATIC PCIE LINK CONFIGURATION ADJUSTMENT AND METHOD THEREOF

(71) Applicants: INVENTEC (PUDONG) TECHNOLOGY CORPORATION, Shanghai (CN); INVENTEC CORPORATION, Taipei (TW)

(72) Inventor: Ye Liu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 17/355,963

(22) Filed: Jun. 23, 2021

(65) Prior Publication Data

US 2022/0292045 A1 Sep. 15, 2022

(30) Foreign Application Priority Data

Mar. 12, 2021 (CN) .......................... 202110269588.0

(51) Int. Cl.
*G06F 13/42* (2006.01)
*G06F 9/445* (2018.01)

(52) U.S. Cl.
CPC ...... *G06F 13/4221* (2013.01); *G06F 9/44505* (2013.01); *G06F 2213/0026* (2013.01)

(58) Field of Classification Search
CPC ............. G06F 13/4221; G06F 9/44505; G06F 2213/0026

(Continued)

(56) References Cited

U.S. PATENT DOCUMENTS

2006/0271713 A1* 11/2006 Xie ..................... G06F 13/4221
                                                                    710/100
2007/0186088 A1   8/2007 Khatri et al.
(Continued)

FOREIGN PATENT DOCUMENTS

CN          1924844 A      3/2007
CN        101059766 A     10/2007
(Continued)

*Primary Examiner* — Idriss N Alrobaye
*Assistant Examiner* — Henry W Yu
(74) *Attorney, Agent, or Firm* — Muncy, Geissler, Olds & Lowe, P.C.

(57) ABSTRACT

A circuit structure with automatic PCIe lane configuration adjustment and a method thereof are disclosed. The circuit structure includes a plurality of PCIe riser cards and a motherboard. The PCIe riser cards are of at least two lane sizes each associated with a PCIe size identifier. The motherboard includes a plurality of PCIe ports, a CPLD module, a storage unit, a BMC module and a BIOS unit. The PCIe ports are electrically connected to the respective PCIe riser cards via a plurality of PCIe cables. The CPLD module is electrically connected to the PCIe ports so as to be able to read the PCIe size identifiers thereof and determine current configuration information from a comparison between the PCIe size identifiers and present signals. The storage unit stores predefined PCIe configuration information, and the BMC module is configured to issue a match signal when finding a match between the current configuration information and the predefined PCIe configuration information, thus allowing booting of the BIOS unit.

6 Claims, 2 Drawing Sheets

(58) Field of Classification Search
USPC .......................... 710/8, 10, 16, 62, 104, 301
See application file for complete search history.

(56) References Cited

U.S. PATENT DOCUMENTS

| | | | |
|---|---|---|---|
| 2008/0172501 A1 | 7/2008 | Goodart et al. | |
| 2008/0263246 A1* | 10/2008 | Larson | G06F 13/372 710/107 |
| 2012/0258611 A1* | 10/2012 | Bingi | H05K 3/10 29/829 |
| 2012/0260015 A1* | 10/2012 | Gay | G06F 13/409 710/301 |
| 2017/0371823 A1* | 12/2017 | Pearson | G06F 13/4282 |
| 2018/0011811 A1* | 1/2018 | Gay | G06F 13/4068 |
| 2018/0349188 A1* | 12/2018 | Beckett | G06F 13/4282 |
| 2019/0079890 A1* | 3/2019 | Matula | G06F 13/4282 |
| 2019/0303318 A1* | 10/2019 | Mao | G06F 13/4282 |
| 2020/0371579 A1* | 11/2020 | Selvam | G06F 13/4295 |

FOREIGN PATENT DOCUMENTS

| | | |
|---|---|---|
| CN | 201215655 Y | 4/2009 |
| CN | 109828942 A | 5/2019 |
| CN | 110347435 A | 10/2019 |
| CN | 110347553 A | 10/2019 |
| CN | 111159085 A | 5/2020 |
| CN | 112069107 A | 12/2020 |
| CN | 112181505 A | 1/2021 |

\* cited by examiner

CIRCUIT STRUCTURE WITH AUTOMATIC PCIE LINK CONFIGURATION ADJUSTMENT AND METHOD THEREOF

CROSS-REFERENCES TO RELATED APPLICATION

This application claims the priority of Chinese patent application number 202110269588.0, filed on Mar. 12, 2021, the entire contents of which are incorporated herein by reference.

TECHNICAL FIELD

The present invention relates to a circuit structure with automatic adjustment of configuration settings, in particular, with automatic PCIe lane configuration adjustment, as well as to a method thereof.

BACKGROUND

In existing server systems, a motherboard usually contains a number of reserved PCIe slots, in which a user can install their own PCIe devices, as well as an EEPROM storing PCIe slot configuration information, with which the operating system can allocate the PCIe slots and the CPU's PCIe lanes so that any installed PCIe device is identifiable. However, recent vigorous advances in the network technology have brought about an increasing demand for servers with higher processing power. To address this need, latest products from manufacturers of server systems employ multiple Slimline x8 connectors as PCIe ports in lieu of the traditional PCIe slots. The space saved from the removal of the PCIe slots can accommodate more Slimline x8 connectors or other components.

FIG. 1 is a block diagram of a conventional server system with a motherboard connected to riser cards via PCIe ports. As shown, the motherboard PA100 includes a CPLD module PA1, an x4 port PA2, an x8 port PA3 and an x16 port PA4. The x4 port PA2 is electrically connected via a PCIe cable to a riser card equipped with an x4 PCIe slot. The x8 port PA3 is electrically connected via a PCIe cable to a riser card equipped with an x8 PCIe slot. The x16 port PA3 is electrically connected via a PCIe cable to a riser card equipped with an x16 PCIe slot.

As described above, the x4, x8 and x16 ports PA2, PA3, PA4 are all provided by Slimline x8 connectors which are connected to the x4, x8 and x16 PCIe slots PA201, PA301, PA401 of the riser cards PA200, PA300, PA400 via the PCIe cables. For instance, the x16 port PA4 is provided by two Slimline x8 connectors which are connected to respective two Slimline x8 connectors on the riser card via a PCIe cable consisting of two x8 links. In this way, the x16 PCIe slot is electrically connected to the CPLD module PA1 via an x16 link.

However, in this conventional system, the CPLD module PA1 relies on PCIe slot configuration information pre-stored in an EEPROM to determine the lane counts of the x4, x8 and x16 ports PA2, PA3, PA4. Accordingly, the x4 port PA2 must be connected to a riser card with the same number of lanes via a PCIe cable. The x8 port PA3 also must be connected to a riser card with the same number of lanes via a PCIe cable. The x16 port PA3 also must be connected to a riser card with the same number of lanes via a PCIe cable. When any of the x4, x8 and x16 ports PA2, PA3, PA4 is connected to a riser card with a different number of lanes, the motherboard PA100 may not work properly. This is particularly likely to happen in applications with a large number of PCIe ports, where a user tends to connect a PCIe port to a wrong riser card due to the identical PCIe cables used.

SUMMARY OF THE INVENTION

In view of the above-described problem with the conventional servers employing primarily Slimline x8 connectors as PCIe ports in place of PCIe slots for space-saving purpose and connecting the PCIe ports to PCIe riser cards via PCIe cables, i.e., in cases of a large number of PCIe ports and hence of PCIe cables, it is very likely for a user to connect a PCIe port to a riser card of an incompatible size due to PCIe cables of the same size being used, which can lead to improper operation of the server, it is a principal object of the present invention to provide a circuit structure with automatic PCIe lane configuration adjustment, which allows allocation of lanes of each PCIe port subsequent to after PCIe cables have been connected to PCIe riser cards, rather than limiting a lane size of each PCIe port.

To this end, the present invention provides a circuit structure with automatic PCIe lane configuration adjustment, which includes a plurality of PCIe riser cards and a motherboard.

The PCIe riser cards are of at least two lane sizes each associated with a PCIe size identifier.

The motherboard includes a plurality of PCIe ports, a CPLD module, a storage unit, a BMC module and a BIOS unit. The PCIe ports are electrically connected to the respective PCIe riser cards via a plurality of PCIe cables and each have a present pin. The CPLD module electrically is connected to the PCIe ports so as to read the associated PCIe size identifiers of the PCIe riser cards from the PCIe ports and present signals from the present pins of the PCIe ports and to determine current configuration information of the PCIe riser cards from a comparison made on the basis of a PCIe size lookup table.

The storage unit stores predefined PCIe configuration information. The BMC module is electrically connected to both the CPLD module and the storage unit and is configured to determine whether there is a match between the current configuration information and the predefined PCIe configuration information and, when finding a match therebetween, issue a match signal. The BIOS unit is electrically connected to the BMC module and configured for PCIe lane configuration adjustment based on the current configuration information and booting in response to receipt of the match signal.

Optionally, the BMC module may be configured to parse a total PCIe riser card count and a total PCIe lane count from the current configuration information and issue the match signal when the total PCIe riser card count and the total PCIe lane count are equal to a predetermined number of supported riser cards and a predetermined number of supported lanes, respectively.

Optionally, the PCIe cables may be all Slimline SAS (SFF-8654) 8-Lane cables.

Optionally, the PCIe size identifiers of the PCIe riser cards may each consist of identification digits from three present pins.

On the basis of the same inventive concept, the present invention also provides a method for automatic PCIe lane configuration adjustment, which includes the steps of: (A) electrical connection of a plurality of PCIe riser cards to respective PCIe ports by a plurality of PCIe cables; (B) transmission from the PCIe riser cards of respective associated PCIe size identifiers to the respective PCIe ports via the PCIe cables; (C) transmission from the PCIe ports of both the PCIe size identifiers of the PCIe riser cards and present signals from the PCIe ports to a CPLD module; (D) generation of current configuration information of the PCIe riser cards by the CPLD module from a comparison made between the PCIe size identifiers of the PCIe riser cards and the present signals from the PCIe ports on the basis of a PCIe size lookup table and transmission of the current configuration information by the CPLD module to a BMC module; and (E) determination of whether there is a match between the current configuration information and predefined PCIe configuration information and issuance of a match signal to a BIOS unit when finding a match therebetween by the BMC module and responsive PCIe lane configuration based on the current configuration information by the BIOS unit and booting thereof.

Optionally, in response to receipt of the present signals from the PCIe devices, the PCIe riser cards may provide identification digits from three present pins.

As noted above, the BIOS unit performs PCIe lane configuration adjustment and booting when predefined PCIe configuration information is founded to be matched with current configuration information determined by the CPLD module from a comparison between the associated PCIe size identifiers of the PCIe riser cards with present signals from the PCIe ports.

The present invention will be described below in greater detail by way of specific embodiments with reference to the accompanying drawings.

LIST OF REFERENCE NUMERALS IN THE DRAWINGS

PA100 Motherboard
PA1 CPLD Module
PA2 X4 Port
PA3 X8 Port
PA4 X16 Port
PA200, PA300, PA400 Riser card
PA201 X4 PCIe Slot
PA301 X8 PCIe Slot
PA401 X16 PCIe Slot
100 Circuit Structure with Automatic PCIe Link Configuration Adjustment
1, 2, 3 PCIe Riser Card
11 X8 PCIe Slot
21 X8 PCIe Slot
31 X4 PCIe Slot
32 X16 PCIe Slot
4 Motherboard
41, 41a, 41b, 41c PCIe Port
42 CPLD Module
43 Storage Unit
431 Predefined PCIe Configuration Information
44 BMC Module
45 PCH Module
451 BIOS Unit
44s Match Signal
200, 300, 400 PCIe Device
C1, C2, C3 PCIe Cable

DETAILED DESCRIPTION

Figure 1:
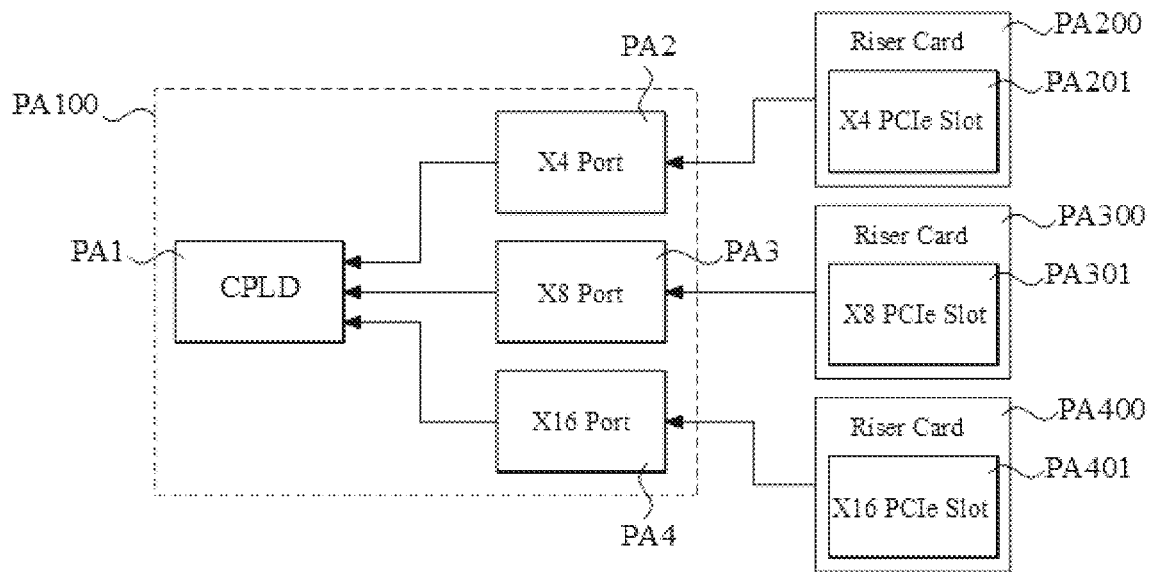
FIG. 1 is a block diagram of a conventional server system with a motherboard connected to riser cards via PCIe ports.
Figure 2:
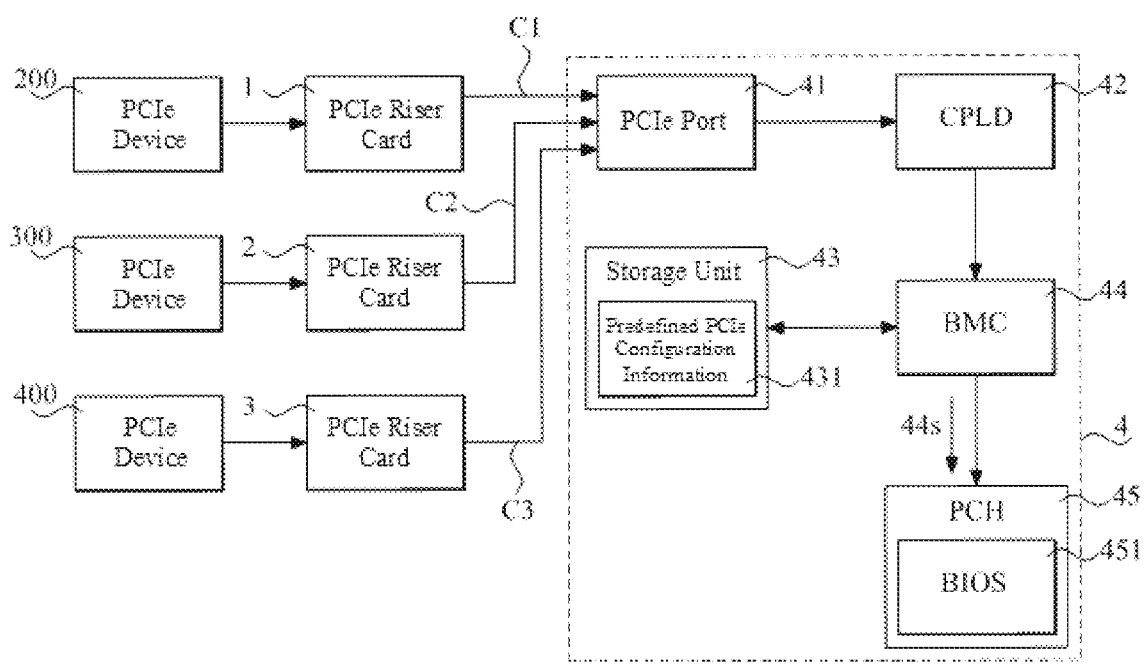
FIG. 2 is a block diagram of a system of a circuit structure with automatic PCIe lane configuration adjustment according to a preferred embodiment of the present invention.
Figure 3:
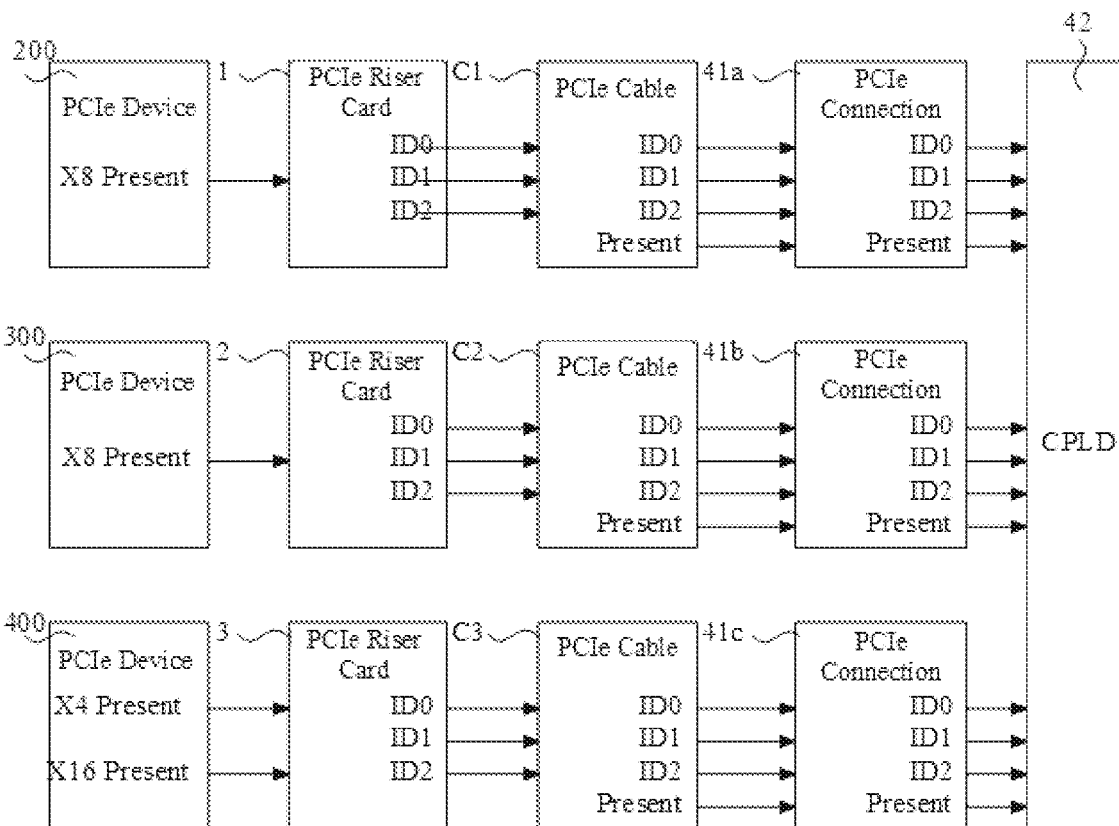
FIG. 3 is a schematic illustration of the circuit structure with automatic PCIe lane configuration adjustment according to a preferred embodiment of the present invention.

Reference is now made to FIG. 2, a block diagram of a system of a circuit structure with automatic PCIe lane configuration adjustment according to a preferred embodiment of the present invention, and to FIG. 3, a schematic illustration of the circuit structure with automatic PCIe lane configuration adjustment according to a preferred embodiment of the present invention. As shown in FIGS. 2 and 3, the circuit structure 100 includes a plurality of PCIe riser cards 1, 2, 3 (only three are shown in this embodiment for the purpose of illustration) and a motherboard 4. Although this embodiment is described with three PCIe riser cards 1, 2, 3 being included as an example, the number of PCIe riser cards is not so limited in practical applications. In addition, in this embodiment, each of the PCIe riser cards 1, 2, 3 has a lane size and is associated with a PCIe size identifier which identifies the specific PCIe riser card 1, 2 or 3 as an x4, x8, or x16 card.

The motherboard 4 includes a plurality of PCIe ports 41 (only one is shown in FIG. 2 for the purpose of illustration), a CPLD module 42 (labeled only as "CPLD" in the figures), a storage unit 43, a BMC module 44 ("BMC") and a PCH module 45 ("PCH").

As shown in FIG. 2, the PCIe ports 41 are electrically connected to the respective PCIe riser cards 1, 2, 3 via PCIe cable C1, C2, C3 (only three are shown), and the PCIe riser cards 1, 2, 3 are configured to connect respective PCIe devices 200, 300, 400. In this embodiment, the PCIe cables C1, C2, C3 are all Slimline SAS 8-Lane cables (compliant with the standard SFF-8654).

The CPLD module 42 is electrically connected to the plurality of PCIe ports 41 so as to be able to read therefrom both PCIe size identifiers associated with the PCIe riser cards 1, 2, 3 and a plurality of present signals. The CPLD module 42 is configured to obtain current configuration information of the PCIe riser cards 1, 2, 3 from a PCIe size lookup table.

In this embodiment, the PCIe size lookup table is, for example, the following Table 1.

| PCIe Size | ID0 | ID1 | ID2 |
|---|---|---|---|
| x4 | 0 | 0 | 1 |
| x8 | 0 | 1 | 0 |
| x16 | 1 | 0 | 0 |
| x4 + x8 | 0 | 1 | 1 |
| x4 + x16 | 1 | 0 | 1 |
| x8 + x16 | 1 | 1 | 0 |

The storage unit 43 stores predefined PCIe configuration information 431. The BMC module 44 is electrically connected to both the CPLD module 42 and the storage unit 43 and configured to parse a total PCIe riser card count and a total PCIe lane count from the current configuration information. If the total PCIe riser card count and the total PCIe lane count are equal to a total number of supported riser cards and a total number of supported lanes, which are both indicated in the PCIe configuration information 431, the BMC module 44 is further configured to issue a match signal. The PCH module 45 is electrically connected to the BMC module 44 and contains a built-in BIOS unit 451 ("BIOS"), which is configured to, in response to receipt of the match signal at the PCH module 45, adjust PCIe lane configuration based on the current configuration information and boot.

Figure 4:
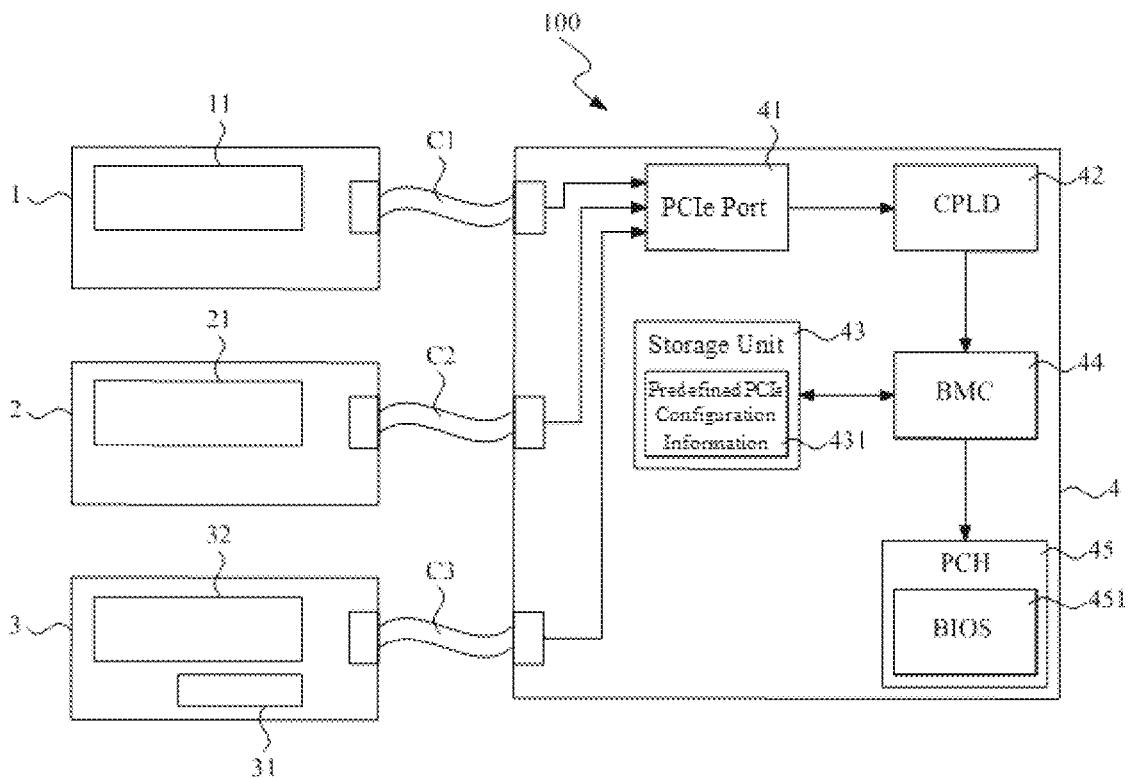
FIG. 4 is a schematic plan view of the circuit structure with automatic PCIe lane configuration adjustment according to a preferred embodiment of the present invention.

Reference is now made to FIG. 4, a schematic plan view of the circuit structure with automatic PCIe lane configuration adjustment according to a preferred embodiment of the present invention. As shown in FIGS. 2 and 4, continuing the example of the schematic circuit diagram of FIG. 3 with the three PCIe ports 41a, 41b, 41c being shown to illustrate PCIe ports 41, in this embodiment, the PCIe riser card 1 has an x8 PCIe slot 11, the PCIe riser card 2 has an x8 PCIe slot 21 and the PCIe riser card 3 has both an x4 PCIe slot 31 and an x16 PCIe slot 32.

As discussed above, in practice, due to the x8 PCIe slot 11 on the PCIe riser card 1, the PCIe riser card 1 is built in with a PCIe size identifier that identifies the x8 PCIe slot 11. In this embodiment, the PCIe size identifier for the PCIe riser card 1 may consist of three identification digits, e.g., ID0, ID1 and ID2. The three identification digits for the PCIe riser card 1 may be output from respective three present pins ID0, ID1, ID2 when a present signal is received at an x8 present pin of the x8 PCIe slot 11 on the PCIe riser card 1 from the PCIe device 200. In this embodiment, the PCIe size identifier of the PCIe riser card 1 consisting of the three identification digits may be "010". Thus, according to the above PCIe size lookup table, the size of the PCIe riser card 1 can be determined as 8-lanes (x8).

Similarly, due to the x8 PCIe slot 21 on the PCIe riser card 2, the PCIe riser card 2 is built in with a PCIe size identifier that identifies the x8 PCIe slot 21. In this embodiment, the PCIe size identifier for the PCIe riser card 2 may also consist of three identification digits, e.g., ID0, ID1 and ID2. The three identification digits for the PCIe riser card 2 may be output from respective three present pins ID0, ID1, ID2 when a present signal is received at an x8 present pin of the x8 PCIe slot 21 on the PCIe riser card 2 from the PCIe device 300. In this embodiment, the PCIe size identifier of the PCIe riser card 2 consisting of the three identification digits may also be "010". Thus, according to the above PCIe size lookup table, the size of the PCIe riser card 2 can be determined as 8-lanes (x8).

Further, due to both the x4 PCIe slot 31 and x16 PCIe slot 32 on the PCIe riser card 3, the PCIe riser card 3 is built in with a PCIe size identifier that identifies both the x4 PCIe slot 31 and the x16 PCIe slot 32. In this embodiment, the PCIe size identifier for the PCIe riser card 3 may consist of three identification digits, e.g., ID0, ID1 and ID2. The three identification digits for the PCIe riser card 3 may be output from respective three present pins ID0, ID1, ID2 when a present signal is received at an x4 present pin of the x4 PCIe slot 31 and an x16 present pin of the x16 PCIe slot 32 on the PCIe riser card 3 from the PCIe device 400. In this embodiment, the PCIe size identifier of the PCIe riser card 3 consisting of the three identification digits may be "101". Thus, according to the above PCIe size lookup table, the size of the PCIe riser card 3 can be determined as 4+16-lanes (x4+x16). Since the PCIe riser card 3 has both the x4 and x16 PCIe slots 31, 32, it is actually equivalent to an x4-size PCIe device (not shown) combined with an x16-size PCIe device (not shown). In practice, signal transmission between the PCIe riser card 3 and the PCIe port 41c is carried out via the PCIe cable C3. Since x8 cables are used in this embodiment, PCIe riser card 3 is connected to three PCIe ports 41c via respective three PCIe cables C3 (one for the x4 PCIe device and the other two for the x16 PCIe device).

Therefore, in this embodiment, a total of five PCIe ports (one PCIe port 41a, one PCIe port 41b and three PCIe ports 41c) are used to connect the three PCIe riser cards 1, 2, 3. The PCIe ports 41a, 41b, 41c may be distinguished from one another by using different voltages for the present signals in the PCIe cables C1, C2, C3. For example, the present signal in the PCIe cable C1 may have a voltage of 0.3 V, the present signal in the PCIe cable C2 may have a voltage of 0.42 V, and the present signal in each PCIe cable C3 may have a voltage of 0.67 V. In this way, there are three 0.67 V present signals, making it possible to determine that three PCIe cables C3 are used.

With continued reference to FIGS. 2 to 4, when the CPLD module 42 receives the identification digits of the PCIe size identifiers associated with the PCIe riser cards 1, 2, 3 from the PCIe ports 41 (including 41a, 41b and 41c) and the present signals from the PCIe cables C1, C2, C3, it can determine from the PCIe size lookup table that the current configuration information of the PCIe riser cards 1, 2, 3 represents that there are two x8 lanes, one x4 lane and one x16 lane. Thereafter, the CPLD module 42 transmits the current configuration information to the BMC module 44, which then compares the current configuration information (the total PCIe riser card count and total PCIe lane count) with the predefined PCIe configuration information 431 (the total numbers of supported riser cards and lanes) and, when finding a match therebetween, issues a match signal 44s to the PCH module 45, allowing booting of the BIOS unit 451.

On the basis of the above-described circuit structure 100 with automatic PCIe lane configuration adjustment, a method for automatic PCIe lane configuration adjustment according to the present invention includes essentially: electrical connection of a plurality of PCIe riser cards 1, 2, 3 to a plurality of PCIe ports 41a, 41b, 41c by respective PCIe cables C1, C2, C3; transmission of PCIe size identifiers from the PCIe riser cards 1, 2, 3 to the PCIe ports 41a, 41b, 41c through the PCIe cables C1, C2, C3; transmission, from the PCIe ports 41a, 41b, 41c, of both the PCIe size identifiers of the PCIe riser cards 1, 2, 3 and present signals at the PCIe ports 41a, 41b, 41c, to the CPLD module 42; generation of current configuration information by the CPLD module 42 from a comparison made between the PCIe size identifiers of the PCIe riser cards 1, 2, 3 and the present signal from the PCIe ports 41a, 41b, 41c based on a PCIe size lookup table and transmission of the current configuration information to the BMC module 44; and determination of whether there is a match between the current configuration information and predefined PCIe configuration information 431, issuance of a match signal 44s to the BIOS unit 451 when finding a match therebetween, by the BMC module 44, and PCIe lane configuration adjustment made by the BIOS unit 451 based on the current configuration information and booting thereof.

In summary, the conventional server motherboards that utilize Slimline x8 connectors and PCIe cables to connect PCIe riser cards are prone to misconnection of a PCIe port to a riser card of an incompatible size due to the identical PCIe cables being used, which may lead to improper operation of the server. By contrast, according to the present invention, the CPLD module can determine current configuration information from a comparison between PCIe size identifiers of PCIe riser cards and present signals from PCIe ports on the basis of a PCIe size lookup table, and the BIOS unit can perform PCIe lane configuration adjustment based on the current configuration information and booting when the current configuration information is founded to be matched with predefined PCIe configuration information. Therefore, the present invention eliminates the need for exactly connecting PCIe ports to corresponding PCIe riser cards and allows arbitrary connection of PCIe cables between PCIe ports and riser cards as long as the total numbers of PCIe lanes and riser cards are both in line with the predefined PCIe configuration information. This results in effective improvements in the convenience of use.

The preferred embodiments as described in detail above are intended merely to more clearly explain the features and spirit of the present invention rather than to limit the scope thereof to these disclosed embodiments in any sense. On the contrary, it is intended that various changes and equivalent arrangements are also covered by the scope of the present invention as defined in the appended claims.

What is claimed is:

1. A circuit structure with automatic PCIe lane configuration adjustment, comprising:
    a plurality of PCIe riser cards of at least two lane sizes each associated with a PCIe size identifier; and
    a motherboard, comprising:
        a plurality of PCIe ports electrically connected to the respective PCIe riser cards by a plurality of PCIe cables, each of the plurality of PCIe ports having a present pin;
        a CPLD module electrically connected to the plurality of PCIe ports, the CPLD module configured to read the associated PCIe size identifiers of the plurality of PCIe riser cards from the plurality of PCIe ports and a plurality of present signals from the present pins of the plurality of PCIe ports and determine a current configuration information of the plurality of PCIe riser cards by a comparison made based on a PCIe size lookup table;
        a storage unit storing a predefined PCIe configuration information;
        a BMC module electrically connected to the CPLD module and the storage unit, the BMC module configured to determine whether there is a match between the current configuration information and the predefined PCIe configuration information and send a match signal when finding a match between the current configuration information and the predefined PCIe configuration information; and
        a BIOS unit electrically connected to the BMC module, the BIOS unit configured for PCIe lane configuration adjustment based on the current configuration information and booting upon receiving the match signal.

2. The circuit structure of claim 1, wherein the BMC module is configured to parse a total PCIe riser card count and a total PCIe lane count from the current configuration information and send the match signal when the total PCIe riser card count and the total PCIe lane count are equal to a predetermined number of supported riser cards and a predetermined number of supported lanes, respectively.

3. The circuit structure of claim 1, wherein the plurality of PCIe cables are all Slimline SAS 8-Lane cables.

4. The circuit structure of claim 1, wherein the PCIe size identifiers of the plurality of PCIe riser cards each consist of identification digits from three present pins.

5. A method for automatic PCIe lane configuration adjustment, comprising the steps of:
    A) electrical connection of a plurality of PCIe riser cards to a plurality of PCIe ports by a plurality of PCIe cables;
    B) transmission from the plurality of PCIe riser cards of respective associated PCIe size identifiers to the respective PCIe ports via the plurality of PCIe cables;
    C) transmission from the plurality of PCIe ports of both the PCIe size identifiers of the plurality of PCIe riser cards and present signals from the plurality of PCIe ports to a CPLD module;
    D) generation of a current configuration information of the plurality of PCIe riser cards by the CPLD module from a comparison made between the PCIe size identifiers of the plurality of PCIe riser cards and the present signals from the plurality of PCIe ports on the basis of a PCIe size lookup table and transmission of the current configuration information by the CPLD module to a BMC module; and
    E) determination of whether there is a match between the current configuration information and a predefined PCIe configuration information and sending of a match signal to a BIOS unit when finding a match between the current configuration information and the predefined PCIe configuration information by the BMC module and responsive PCIe lane configuration adjustment based on the current configuration information by the BIOS unit and booting of the BIOS unit.

6. The method of claim 5, wherein in response to receipt of the present signals from the plurality of PCIe ports, the plurality of PCIe riser cards provide identification digits from three present pins.

* * * * *